(12) United States Patent
Du et al.

(10) Patent No.: US 12,260,590 B2
(45) Date of Patent: Mar. 25, 2025

(54) SYSTEM AND METHOD FOR ONLINE CAMERA TO GROUND ALIGNMENT

(71) Applicant: GM Global Technology Operations LLC, Detroit, MI (US)

(72) Inventors: Xinyu Du, Oakland Township, MI (US); Yao Hu, Sterling Heights, MI (US); Binbin Li, College Station, TX (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 442 days.

(21) Appl. No.: 17/719,151

(22) Filed: Apr. 12, 2022

(65) Prior Publication Data

US 2023/0326077 A1 Oct. 12, 2023

(51) Int. Cl.
| | |
|---|---|
| *G06K 9/00* | (2022.01) |
| *B60W 40/04* | (2006.01) |
| *G06T 7/80* | (2017.01) |
| *G06V 10/40* | (2022.01) |

(52) U.S. Cl.
CPC .............. *G06T 7/80* (2017.01); *B60W 40/04* (2013.01); *G06V 10/40* (2022.01); *B60W 2420/403* (2013.01); *G06T 2207/30252* (2013.01)

(58) Field of Classification Search
CPC ............. G06T 7/80; G06T 2207/30252; G06T 2207/30244; G06T 2207/30256; G06T 7/73; G06T 7/33; G06T 7/70; G06T 2207/10016; B60W 40/04; B60W 2420/403; G06V 10/40; G06V 20/58; G06V 20/46; H04N 5/2628
See application file for complete search history.

(56) References Cited

U.S. PATENT DOCUMENTS

| | | | |
|---|---|---|---|
| 9,792,683 B2* | 10/2017 | Bone | G06T 7/80 |
| 9,946,264 B2* | 4/2018 | Liao | G06T 7/246 |
| 10,108,866 B2* | 10/2018 | Prinet | G06V 10/44 |
| 11,887,323 B2* | 1/2024 | Chakravarty | G06T 7/70 |
| 2010/0097457 A1* | 4/2010 | Zhang | G06V 20/58 |
| | | | 348/119 |
| 2021/0371260 A1* | 12/2021 | Chien | G06T 7/50 |
| 2022/0277478 A1* | 9/2022 | Teng | G06T 7/74 |
| 2022/0383529 A1* | 12/2022 | Lee | G06V 20/58 |
| 2022/0414933 A1* | 12/2022 | Sung | G06T 7/73 |

FOREIGN PATENT DOCUMENTS

| | | | | | |
|---|---|---|---|---|---|
| CN | 109961522 B | * | 5/2023 | ........ | G06T 19/006 |
| JP | 2009129001 A | * | 6/2009 | ........ | B60R 1/00 |
| KR | 20220000147 A | * | 1/2022 | ........ | G06T 7/20 |

* cited by examiner

*Primary Examiner* — Shervin K Nakhjavan
(74) *Attorney, Agent, or Firm* — CANTOR COLBURN LLP

(57) ABSTRACT

A vehicle, a system and a method of navigating the vehicle. The system includes a camera conveyed by the vehicle and a processor. The camera is configured to obtain an original image data file of an environment. The processor is configured to reduce the original image data file to obtain a reduced image data file and determine an alignment between a camera-centered coordinate system and a ground coordinate system using the reduced image data file.

20 Claims, 13 Drawing Sheets

SYSTEM AND METHOD FOR ONLINE CAMERA TO GROUND ALIGNMENT

The subject disclosure relates to computer imaging in autonomous vehicles and, in particular, to a system and method for determining an alignment between ground and a camera installed on the vehicle.

Navigation of an autonomous vehicle can involve obtaining an image of a scene, determining the location of objects within the scene, and building a trajectory through the scene that avoids these objects based on the locations of the objects. A camera can be installed on the vehicle to obtain the image. The difference between a camera-centered coordinate system and a coordinate system of the ground around the vehicle can introduce errors into the calculations of the locations of the objects. Accordingly, it is desirable to provide a method for determining an alignment between the camera and the ground.

SUMMARY

In one exemplary embodiment, a method of navigating a vehicle is disclosed. An original image data file of an environment is obtained at a camera conveyed by the vehicle. The original image data file is reduced to obtain a reduced image data file. An alignment between a camera-centered coordinate system and a ground coordinate system is determined using the reduced image data file.

In addition to one or more of the features described herein, the original image data file includes a plurality or temporally spaced frames. Obtaining the reduced image data file further includes at least one of selecting a first frame and a second frame from the plurality of temporally spaced frames of the original image data file, wherein a temporal spacing between the first frame and the second frame is based on a velocity of the vehicle, removing a pixel from a frame of the original image data file using on a reduction algorithm, and cropping the frame to remove a section of the frame. The method further includes forming a feature pair between a first feature of the first frame and a second feature of the second frame and removing the feature pair when a metric of the first feature and the second feature is less than a criterion. The method further includes assigning a quality score to the feature pair and removing the feature pair when the quality score is less than a quality threshold. The method further includes generating a road mask in an image plane of the camera from the alignment. The method further includes determining a weighted average value of the alignment using a confidence level of a moving average of the alignment for a plurality of frames of the reduced image data file.

In another exemplary embodiment, a system for navigating a vehicle is disclosed. The system includes a camera conveyed by the vehicle and a processor. The camera is configured to obtain an original image data file of an environment. The processor is configured to reduce the original image data file to obtain a reduced image data file and determine an alignment between a camera-centered coordinate system and a ground coordinate system using the reduced image data file.

In addition to one or more of the features described herein, the original image data file includes a plurality or temporally spaced frames. The processor is further configured to obtain the reduced image data file by performing at least one of selecting a first frame and a second frame from the plurality of temporally spaced frames of the original image data file, wherein a temporal spacing between the first frame and the second frame is based on a velocity of the vehicle, removing a pixel from a frame of the original image data file using on a reduction algorithm, and cropping the frame to remove a section of the frame. The processor is further configured to form a feature pair between a first feature of the first frame and a second feature of the second frame and remove the feature pair when a metric of the first feature and the second feature is less than a criterion. The processor is further configured to assign a quality score to the feature pair and remove the feature pair when the quality score is less than a quality threshold. The processor is further configured to generate a road mask in an image plane of the camera from the alignment. The processor is further configured to determine a weighted average value of the alignment using a confidence level of a moving average of the alignment for a plurality of frames of the reduced image data file.

In yet another exemplary embodiment, a vehicle is disclosed. The vehicle includes a camera and a processor. The camera is configured to obtain an original image data file of an environment. The processor is configured to reduce the original image data file to obtain a reduced image data file and determine an alignment between a camera-centered coordinate system and a ground coordinate system using the reduced image data file.

In addition to one or more of the features described herein, the original image data file includes a plurality or temporally spaced frames. The processor is configured to obtain the reduced image data file by performing at least one of selecting a first frame and a second frame from the plurality of temporally spaced frames of the original image data file, wherein a temporal spacing between the first frame and the second frame is based on a velocity of the vehicle, removing a pixel from a frame of the original image data file using on a reduction algorithm, and cropping the frame to remove a section of the frame. The processor is further configured to form a feature pair between a first feature of the first frame and a second feature of the second frame and remove the feature pair when a metric of the first feature and the second feature is less than a criterion. The processor is further configured to assign a quality score to the feature pair and remove the feature pair when the quality score is less than a quality threshold. The processor is further configured to generate a road mask in an image plane of the camera from the alignment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
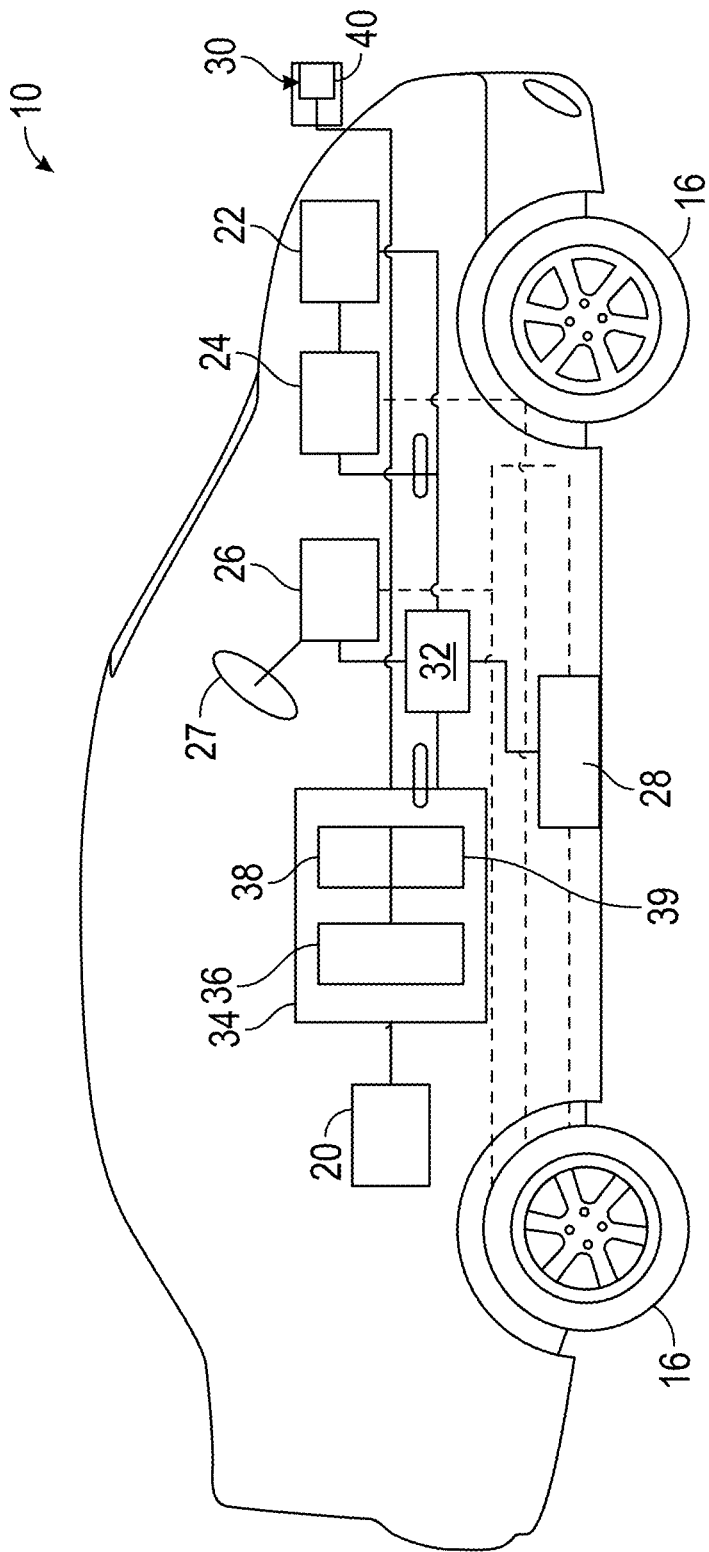
FIG. 1 shows a vehicle in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10. The vehicle 10 can be an autonomous vehicle or a non-autonomous vehicle, in various embodiments. In an exemplary embodiment, the vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

An autonomous vehicle generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle. The propulsion system 22 provides power for creating a motive force for the autonomous vehicle and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a camera 40 that captures images of an exterior environment in front of the autonomous vehicle. The camera 40 can include a plurality of cameras at various locations around the vehicle. The captured images can be stored in an image data file and used for tracking and trajectory planning. The controller 34 builds a trajectory for the autonomous vehicle based on the output of sensor system 30. The controller 34 can provide the trajectory to the actuator system 32 to control the propulsion system 22, transmission system 24, steering system 26, and/or brake system 28 in order to navigate the autonomous vehicle with respect to objects in the road.

The controller 34 includes a processor 36 and a computer readable storage device or computer readable storage medium 38. The storage medium includes programs or instructions 39 that, when executed by the processor 36, operate the autonomous vehicle based on sensor system outputs. The computer readable storage medium 38 may further include programs or instructions 39 that when executed by the processor 36, determine and alignment between a coordinate system of the camera 40 and a coordinate system of the vehicle or a ground-centered coordinate system. Such alignment is useful for accurately determining the location of objects captured in the image from the camera. The alignment value can also be used to display to the driver a bird's eye view of the surrounding environment including objects within the environment. The alignment value is used to accurately place the objects within the bird's eye view. For a sensor system 30 that includes a plurality of cameras, the processor provides alignment of the plurality of cameras so that the images from the plurality of cameras can be projected into a same coordinate system for the bird's eye view, thereby aligning the images in the bird's eye view of the surrounding environment.

Figure 2:
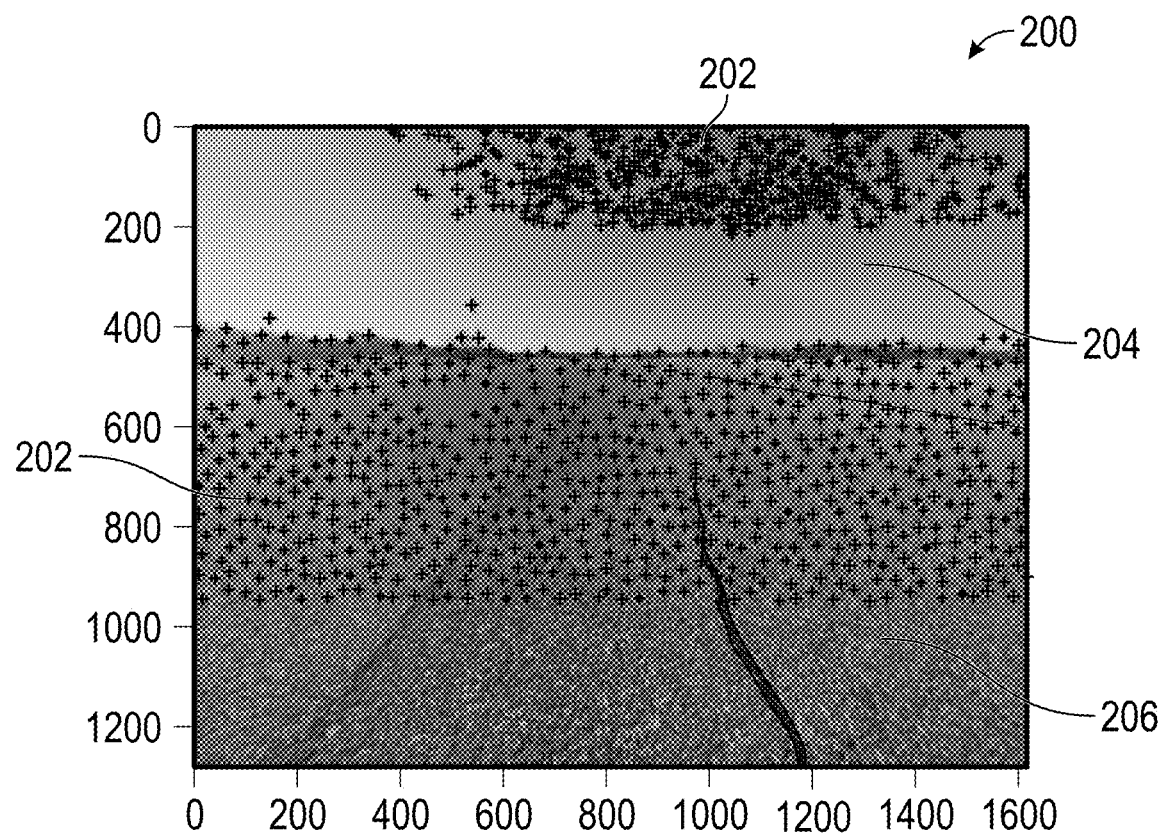
FIG. 2 shows a frame of an image data file used in camera ground alignment, in an illustrative embodiment.

FIG. 2 shows a frame 200 of an image data file used in camera ground alignment, in an illustrative embodiment. The image data file can include a plurality of frames, each frame being temporally spaced from its adjacent frame to form a video file. The frame 200 includes a two-dimensional array of pixels. Each pixel records a point in a region being photographed or filmed by the camera and marks the point using a suitable color, such as a color from a red-green-blue (RGB) color scheme. The frame 200 provides an image of a scene in front of the vehicle. The image includes at least one and generally a plurality of features therein. A feature is a pixel selected within the image. The feature can be selected using any suitable feature detection method, such as a Harris Corner Detection Algorithm, Shi-Tomasi Corner Detection, Kaze Detection, Scale Invariant Feature Transform, etc. Suitable features include objects within the frame, such as a road, an object in the road or alongside the road, an object in the sky, etc. For illustrative purposes, frame 200 shows features 202 associated with the cloud 204 and with the road 206.

Figure 3:
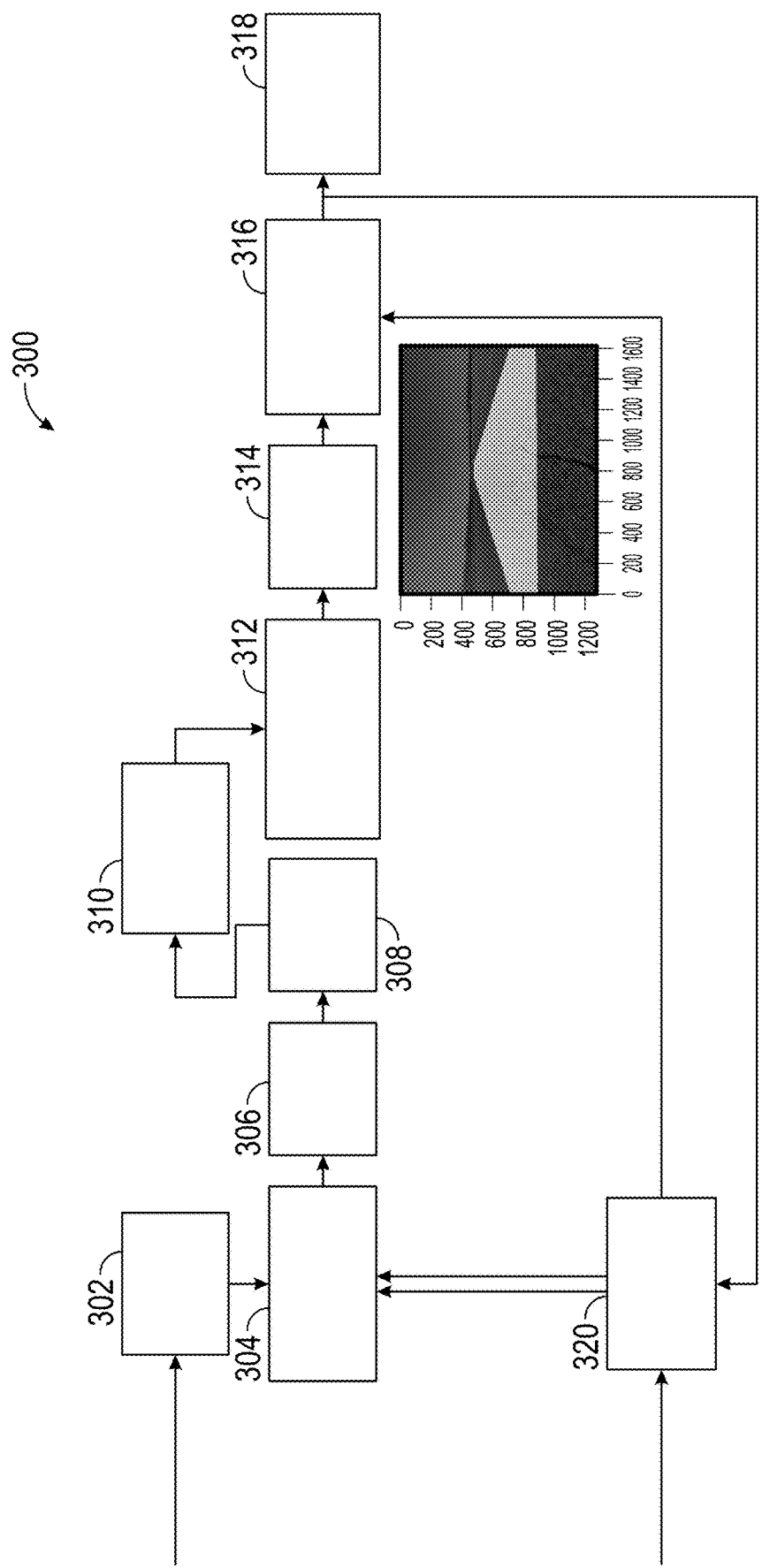
FIG. 3 shows a schematic diagram illustrating a method for determining alignment between a camera of the vehicle and a ground coordinate system of the vehicle.

FIG. 3 shows a schematic diagram 300 illustrating a method for determining alignment between a camera of the vehicle and a ground coordinate system of the vehicle. The schematic diagram 300 includes a plurality of modules that are performed in sequence to determine the alignment. These modules include an image reduction module 302, an image preprocessing module 304, a feature detection module 306, a feature matching module 308, a feature selection and reduction module 310, a transformation module 312, a 3D point estimation module 314, a ground points selection module 316, a confidence generation module 318 and an automatic parameter generation module 320.

The image reduction module 302 reduces a size of an original image data file prior to pre-processing the original image data file. The image reduction module 302 receives the original image data file from the camera 40 and a vehicle speed from a speedometer. Reducing the size of the original image data file includes one or more of selecting a subset of frames from the image data file, resizing (reducing) a frame, and cropping the frame, thereby generating a reduced image data file.

In an embodiment, the image reduction module 302 selects the subset of frames based on a velocity of the vehicle. Each frame is timestamped. A time interval is calculated between a first frame (a previously selected frame) and a second frame (a current frame) of the image data file. A time interval is determined from the time stamp of the first frame and the time stamp of the second frame. This time interval is multiplied by a speed of the vehicle and the product is compared to a threshold value. If the product is less than the threshold value, the second frame is skipped (i.e., not selected for the inclusion in the subset). If the product is greater than the threshold value, the current frame is selected for inclusion in the subset. The subset can then be used in subsequent processing.

Figure 4:
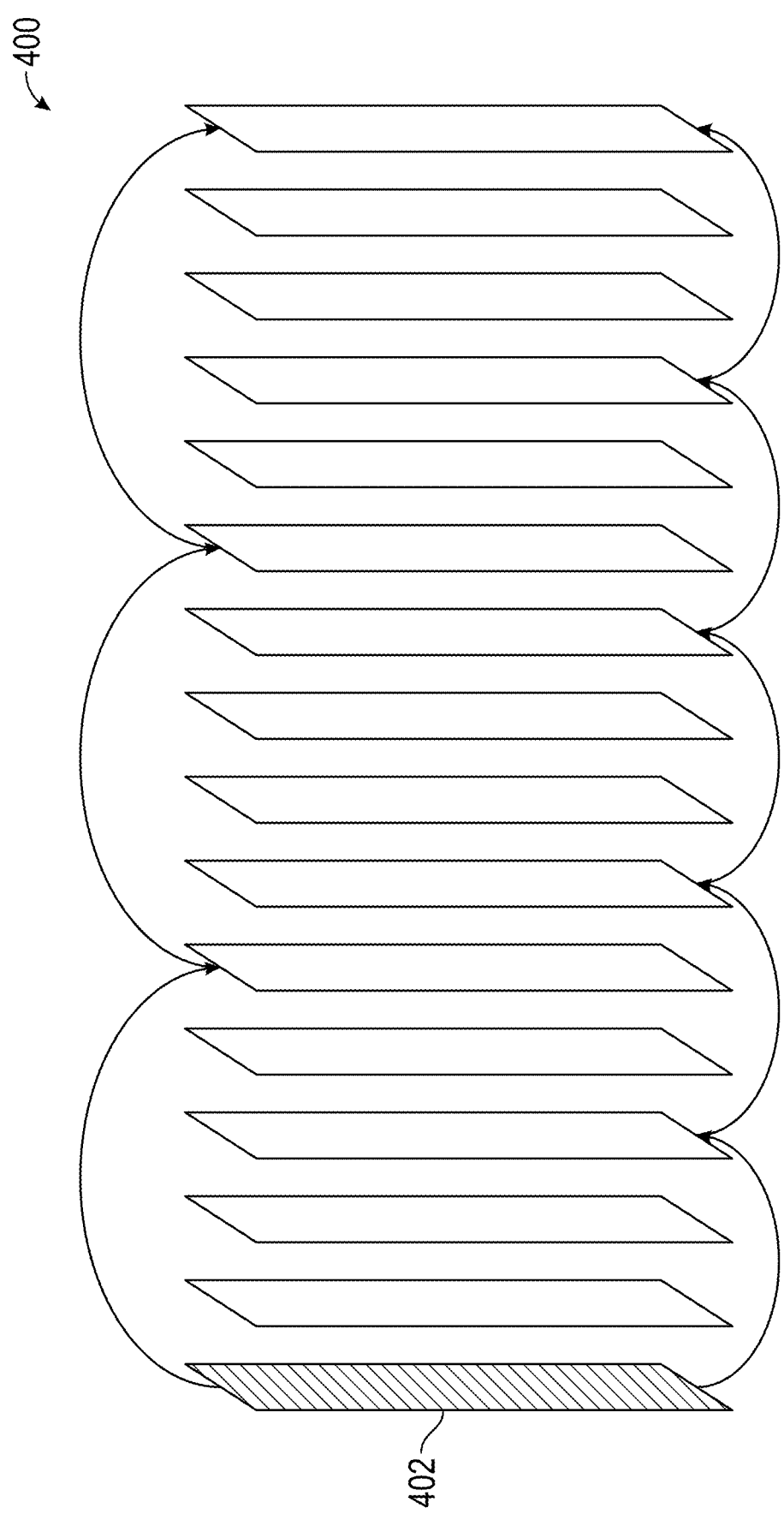
FIG. 4 shows a schematic representation of an original image data file illustrating the effects of vehicle speed on frame selection.

FIG. 4 shows a schematic representation of an original image data file 400 illustrating the effects of vehicle speed on frame selection. Frames are shown represented in temporal succession from left to right. Frame 402 is the first frame or previously selected frame. At a relatively fast vehicle speed, a feature shows significant movement between adjacent frames. Therefore, the frames that are selected are relatively close together in the original image data file or have a relatively small temporal spacing. At a relatively slow vehicle speed, a feature shows little movement between frames. Therefore, movement of the feature may not be distinguishable until many frames have elapsed. Therefore, the frames that are selected are further spaced apart than those accepted at high speeds or have a relatively large temporal spacing. In the illustrative original image data file of FIG. 4, at high velocities, the frame selection algorithm accepts every third frame. At low velocities, the frame selection algorithm accepts every fifth frame.

Returning to the image reduction module 302 of FIG. 3, image resizing and reduction can also be performed. Image resizing and reduction can include removing pixels from the image using a systematic reduction process or reduction algorithm. For example, every other pixel can be removed from the frame as the frame is traversed following a raster pattern.

Image cropping can be used to remove a section of the frame or to divide the frame into a plurality of sub-sections. Cropping is generally performed to remove those sections which have a low or insufficient number of features or to remove those sections for which a low of insufficient number of features is expected. When a section of the frame has an object for which a low density of features is expected (i.e., less than a density threshold), the section can be removed from the image data file. Thus, the sections of the frame that remain are those for which the expected number or density of features is greater than the density threshold. These selected subsections have enough features to be useful in subsequent processing without being computationally wasteful or expensive.

Figure 5:
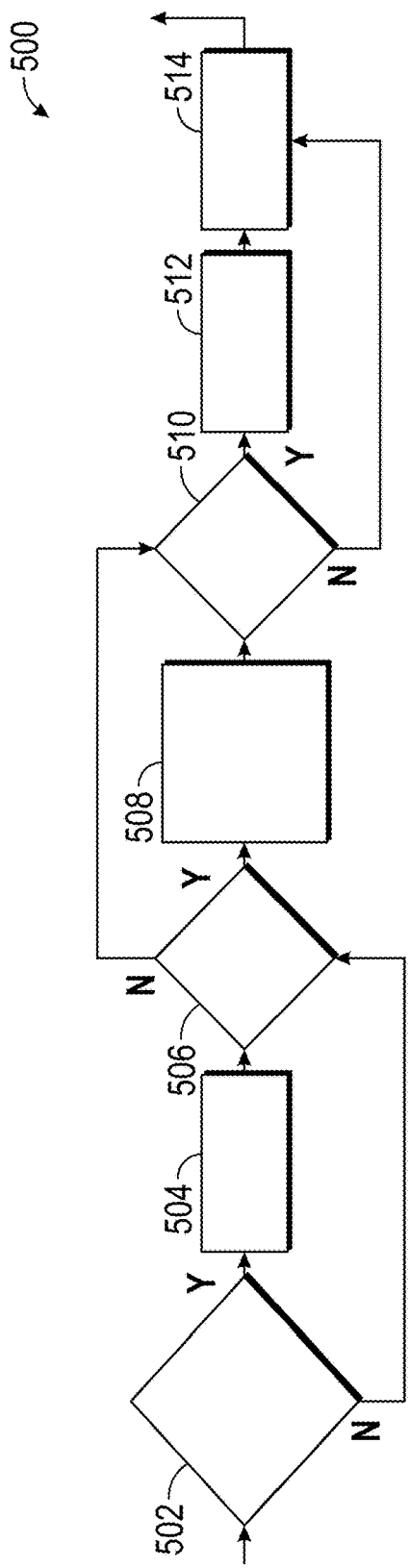
FIG. 5 shows a flowchart of a method of operation of an image reduction module.

FIG. 5 shows a flowchart 500 of a method of operation of the image reduction module 302. In box 502, the image data file is received and a determination is made whether to skip or remove frames from the image data file based on the speed of the vehicle. If frames are to be skipped the method proceeds to box 504. In box 504, the frames are skipped as discussed herein with respect to FIG. 3. The method then proceeds to box 506. Returning to box 502, if frames are not to be skipped the method proceeds directly to box 506.

In box 506, a determination is made whether the image is to be resized or reduced. If the image is to be resized, the method proceeds to box 508. In box 508, the frame is resized as discussed herein. The method then proceeds to box 510. Returning to box 506, if frames are not to be resized or reduced, the method proceeds directly to box 510.

In box 510, a determination is made whether the image is to be cropped. If the image is to be cropped, the method proceeds to box 512, in which it is cropped as discussed herein. The method then proceeds to box 514. Returning to box 510, if frames are not to be cropped, the method proceeds directly to box 514. At box 514, features are detected in the frame. The frame is then sent for preprocessing.

Figure 6:
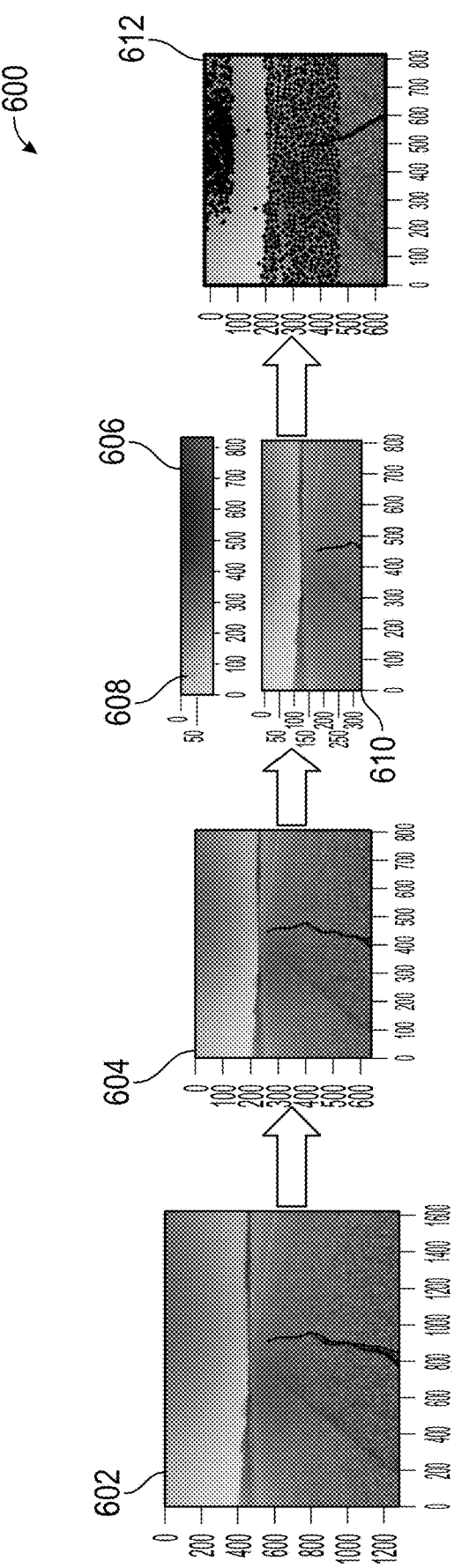
FIG. 6 shows a progression of a frame through the method shown in the flowchart of FIG. 5.

FIG. 6 shows a progression of a frame through the method shown in the flowchart 500 of FIG. 5. Frame 602 is the original frame as received from the camera. Frame 604 is a reduced frame based on the original frame. Frame 606 shows the reduced frame cropped into a first subsection 608 and a second subsection 610. Frame 612 shows the features placed within the part of the frame that includes the first subsection 608 and the second subsection 610.

Returning to FIG. 3, the image preprocessing module 304 performs various preprocessing algorithms, such as data reduction, data cleansing, etc. The feature detection module 306 detects features on the image data file after the preprocessing. Feature detection includes detecting the features in at least a current frame and a previous frame of the subset of frames.

The feature matching module 308 forms feature pairs from the features detected at the feature detection module 306 A feature pair includes a feature from a first frame (e.g., a previous frame) and a corresponding feature from a second frame (e.g., the current frame). The features can be paired based on their relative proximity to each other or to a same location within their respective frames.

The feature selection and reduction module 310 either removes or retains a feature pair based on a proximity criterion. A metric is determined between the features of each feature pair. The metric can be an L2 norm.

In a first embodiment, the metric is determined as a difference between a position of a feature in the first frame and a position of a paired feature in the second frame. The first position $p_i$ of the feature in the first frame is a position at time t and the second position $q_i$ of the feature in the second frame is a position at time t+1). An acceptance criterion is shown in Eq. (1):

$$\|p_i - q_i\|_2 < \epsilon \qquad \text{Eq.(1)}$$

wherein $\epsilon$ is a parallax length threshold variable that defines an upper threshold for the distance between features. When the metric is less than this threshold, the features are relatively stationary and do not demonstrate enough motion between the frames to be suitable for use in subsequent transformation calculations. These features are therefore removed. When the metric is greater than the threshold, the amount of motion shown by the change in position between features makes the feature pair suitable for subsequent transformation calculation. Therefore, these features are retained.

In a second embodiment, the metric is determined from a first distance between a first position $p_i$ of the first feature and a predicted feature position value $c_i$ (which is predicted based on vehicle speed) and a second distance between a second position $q_i$ of the second feature and the predicted feature position $c_i$. The acceptance criterion is stated in Eq. (2):

$$\|q_i - c_i\|_2 < \alpha \|p_i - c_i\|_2 \qquad \text{Eq.(2)}$$

where $\alpha$ is a length threshold variable. When Eq. (2) holds for a feature pair, the feature pair is removed and when Eq. (2) does not hold, the feature pair is retained.

Figure 7:
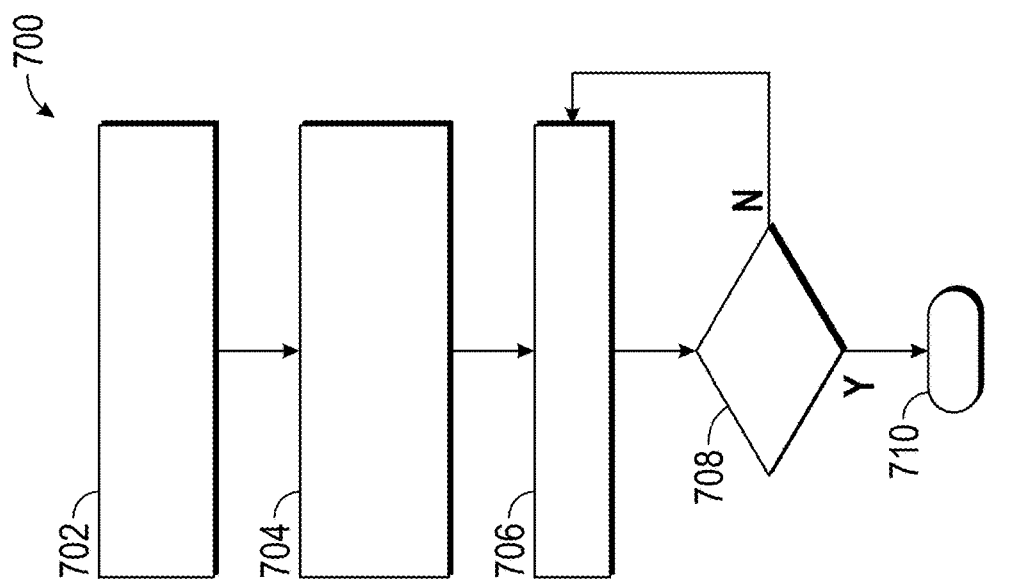
FIG. 7 shows a flowchart of a method for building a set of feature pairs.

In another embodiment, the feature selection and reduction module 310 can reduce the number of features using a quality score for the feature pairs. FIG. 7 shows a flowchart 700 of a method for building a set of feature pairs. In box 702, feature pairs and quality scores are obtained for a pair of frames. In box 704, a quality feature set Q is defined for storing the feature pairs that are acceptable based on their quality. The quality feature set is assigned a maximum size or cardinality N. In box 706, feature pairs are added into the set Q using a quality selection method outlined in FIG. 8 In box 708, the cardinality of set Q is less than the maximum size N, the method returns to box 706. Otherwise, the method proceeds to box 710, in which the method ends.

Figure 8:
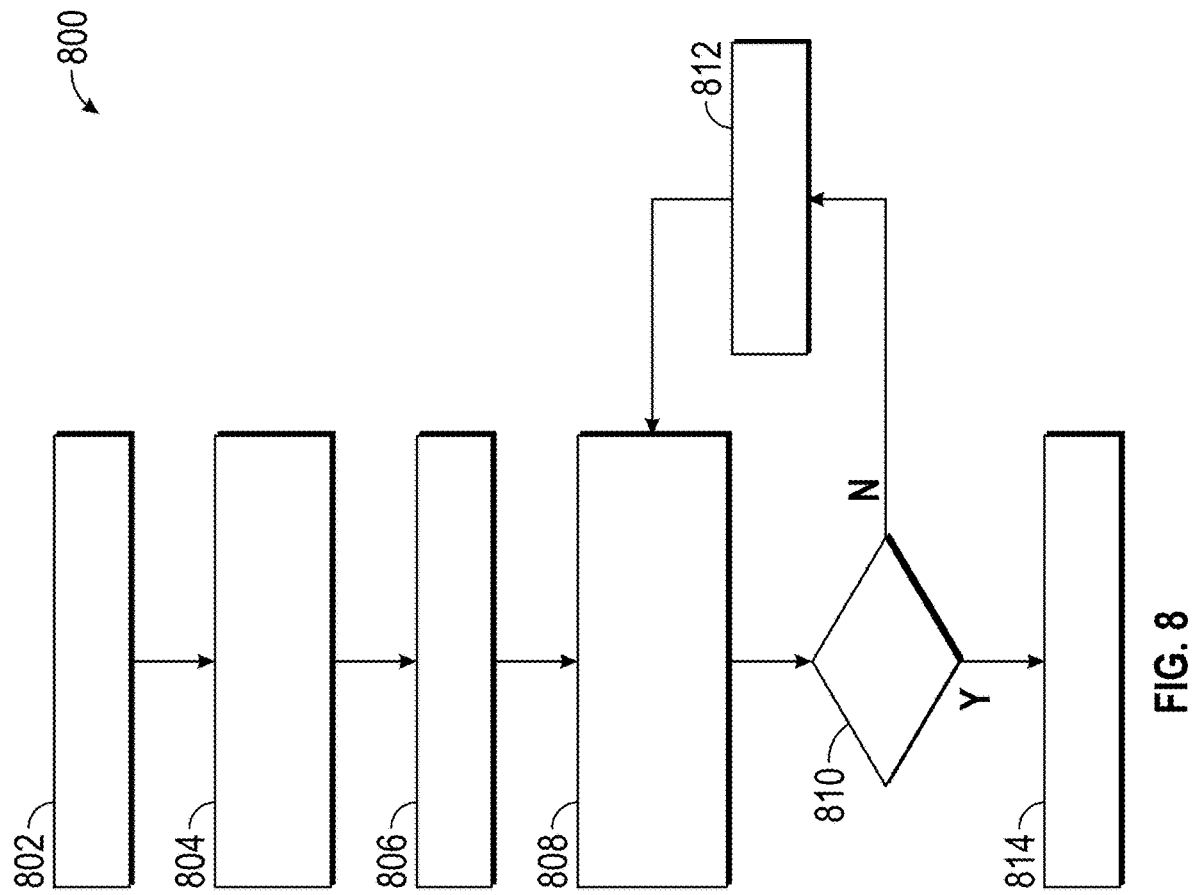
FIG. 8 shows a flowchart of a method for feature pair selection.

FIG. 8 shows a flowchart 800 of a method for feature pair selection. The flowchart 800 is an expansion of the details of box 706 in the flowchart 700. In box 802, a frame is divided into sub-grids. In box 804, the features are sorted into their respective grids. In box 806, a sub-grid is selected for review. In box 808, for a selected sub-grid, a feature pair having a highest quality score is selected for inclusion in a feature set S. The selection of the highest quality score includes comparing the quality scores to a quality threshold, which can be a preselected value. In box 810, the method determines whether the last grid has been reached. If not, the method proceeds to box 812. In box 812, the next grid is selected by increasing a grid index. The method then returns to box 808 to select the highest quality feature pairs from the next grid. Returning to box 810, if the last grid has been reached, the method proceeds to box 814. In box 814, the feature pair set S is merged with the set Q.

Figure 9:
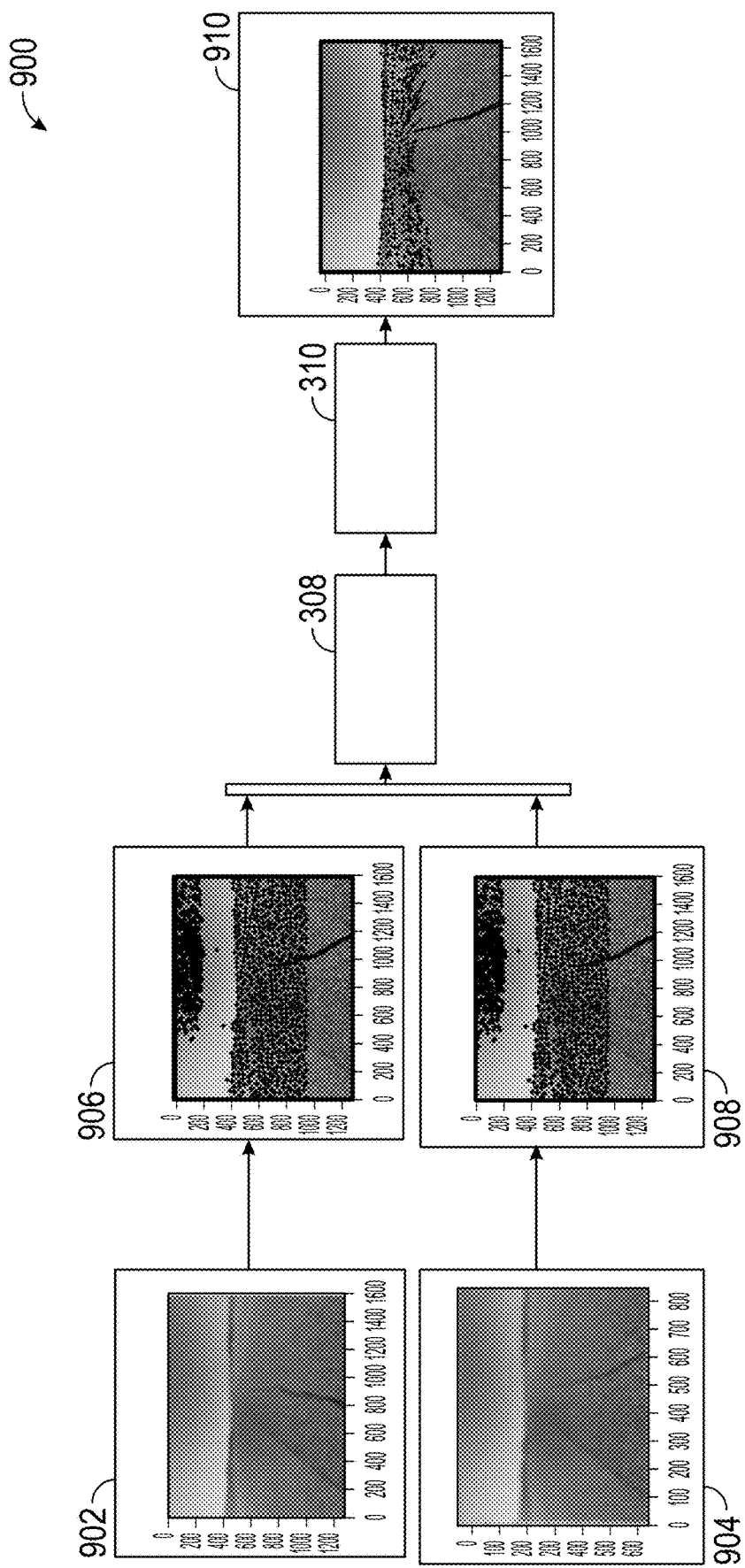
FIG. 9 illustrates an operation of feature pair reduction.

FIG. 9 illustrates the operation of feature pair reduction. Frame t (image 902) and Frame t+1 (image 904) are obtained. Features are detected within Frame t as shown in image 906 and within Frame t+1 as shown in image 908. Image 906 and image 908 and are sent through the feature matching module 308 and the feature selection and reduction module 310, resulting in image 910. Image 910 has a reduced set of features.

Figure 10:
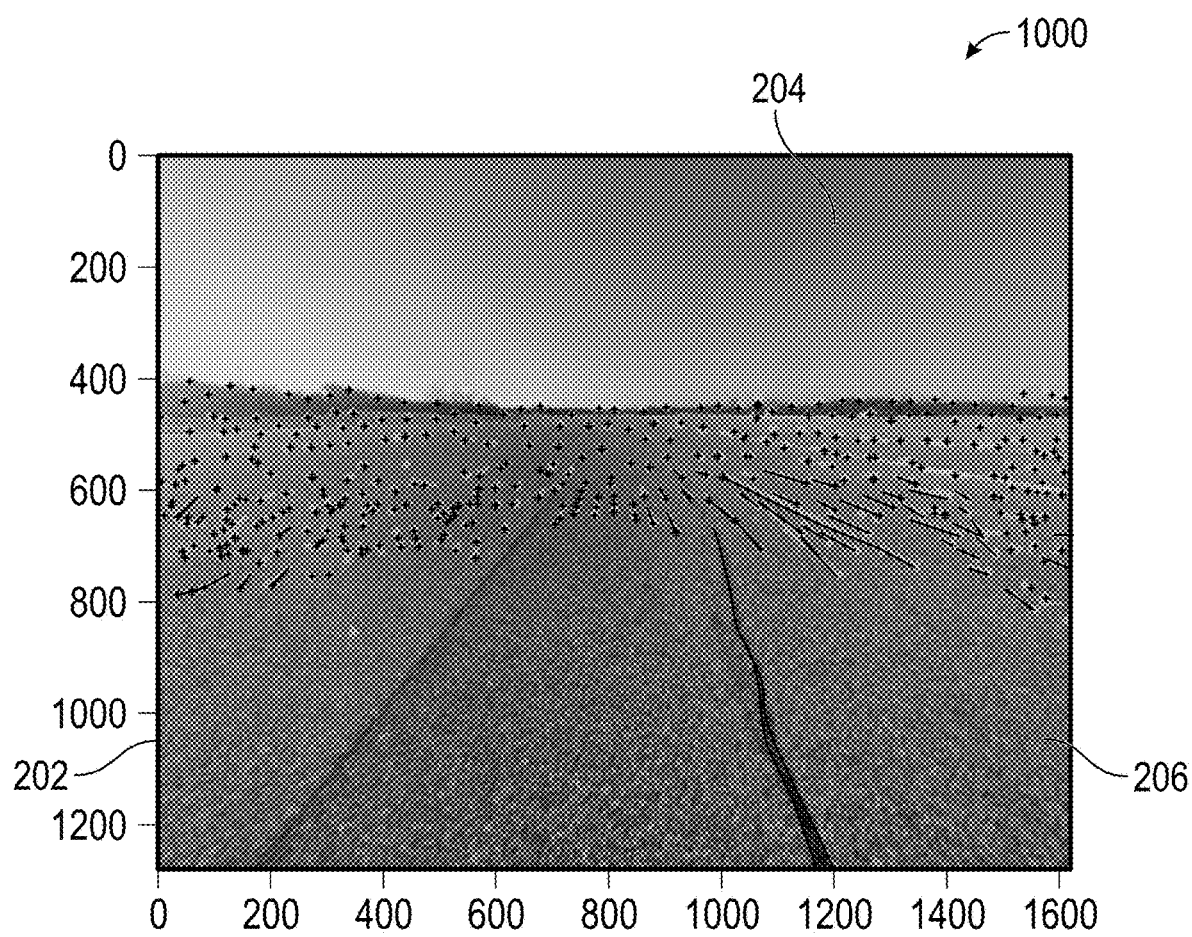
FIG. 10 shows an image with features remaining after feature pair reduction.

FIG. 10 shows an image 1000 with features remaining after the feature pair reduction. In comparison to FIG. 2, the relatively slow features associated with the cloud 204 have been removed. Additionally, a subset of the features 202 associated with the road 206 have been retained.

Returning again to FIG. 3, the transformation module 312 estimate a transformation matrix using the retained features. The transformation matrix defines a transformation between a camera-centered coordinate system for the previous frame of the image data file and the camera-centered coordinate system for the current frame of the image data file. The 3D point estimation module 314 performs a triangulation between features of the feature pairs to determine a location of the feature in three dimensions. The ground points selection module 316, the ground points are determined and fit to a plane. The plane is representative of the road or the driving surface. Once the plane has been determined, an alignment can be determined between the plane and the camera-centered coordinate system. The alignment between a plane-centered coordinate system of the plane and camera-centered coordinate system includes relative translations as well as relative rotation angles. The x and y values are predefined, while the z-values and the pitch, roll and yaw angles are estimated values. The confidence generation module 318 calculates a confidence level for the resulting alignment between camera-centered coordinate system and ground-centered coordinate system and obtains an average of alignment results.

The automatic parameter generation module 320 generates a road mask for use in the alignment process. The road mask can be used at the image preprocessing module 304 and at the ground points selection module 316. Additionally, the results of the alignment process can also be used as feedback at the automatic parameter generation module 320 to adjust the road mask for subsequent calculations.

Figure 11:
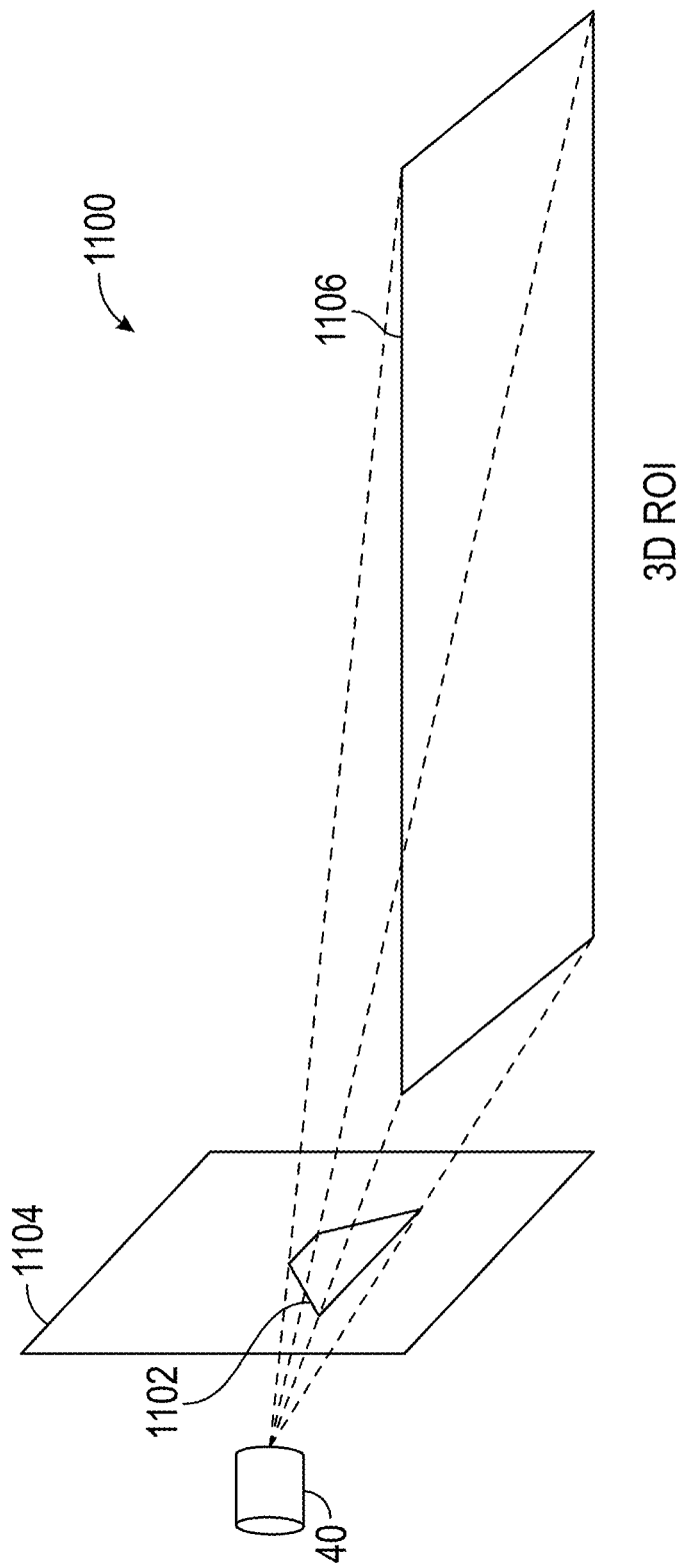
FIG. 11 shows a diagram schematically illustrating a road mask projection.
Figure 12:
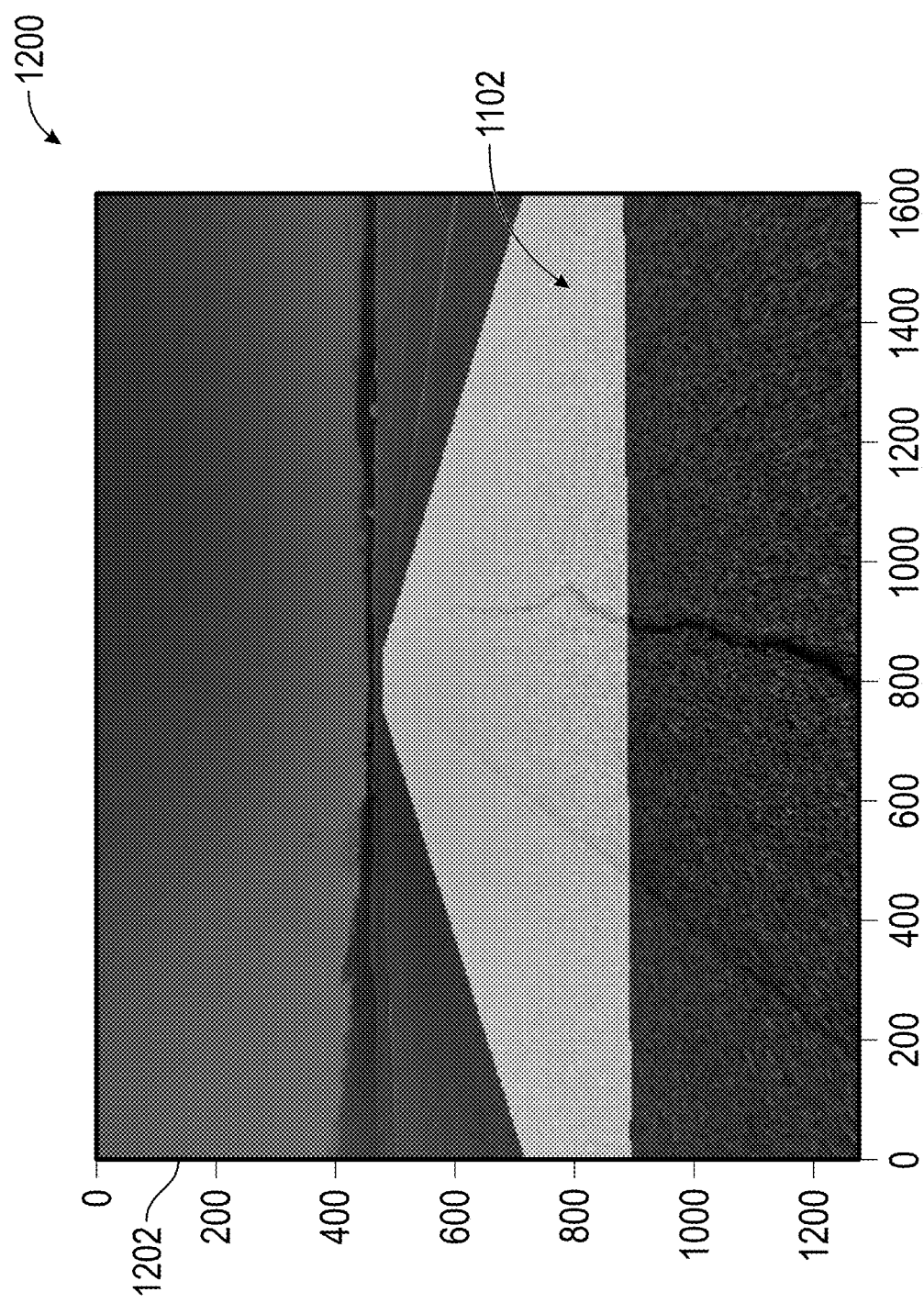
FIG. 12 shows a superposition of the road mask over an image captured at the camera.

FIG. 11 shows a diagram 1100 schematically illustrating a road mask projection. A road mask 1102 is an area in an image plane 1104 of the camera 40 that covers the road upon which the autonomous vehicle is traveling. A three-dimensional region of interest 1106 is defined in the vehicle coordinate system. The three-dimensional region of interest 1106 is defined by the area of the road and is parameterized by corner points $p_v$. The corner points $p_v$ are projected into the image plane 1104 of the camera 40 to form mask corner points $p_c$. The mask corner points $p_c$ can be determined using a transformation such as shown in Eq. (3):

$$p_c = K_{int} \begin{bmatrix} R & T \\ 0 & 1 \end{bmatrix} p_v \qquad \text{Eq. (3)}$$

where $K_{int}$ is an intrinsic transformation matrix for the camera 40, R is a rotation matrix from the vehicle coordinate system to the camera coordinate system, and T is a translation from vehicle coordinate system to camera coordinate system. R and T can be updated at each iteration of the alignment process shown in FIG. 3. Once mask corner points $p_c$ have been determined, the area surrounded by the mask contour points $p_c$ forms the road mask 1102. FIG. 12 shows a superposition 1200 of the road mask 1102 over an image 1202 captured at the camera 40.

Figure 13:
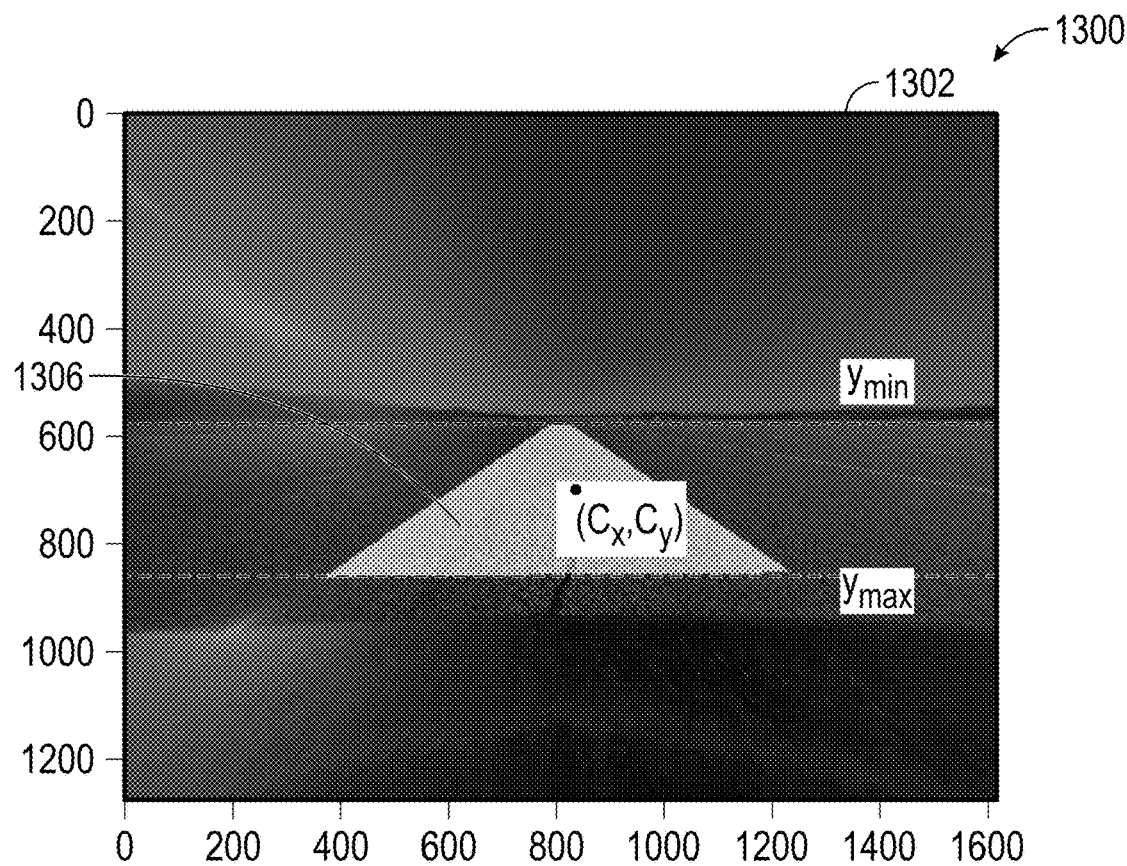
FIG. 13 shows two images demonstrating the scalability of the road mask based on image field of view.
Figure 13:
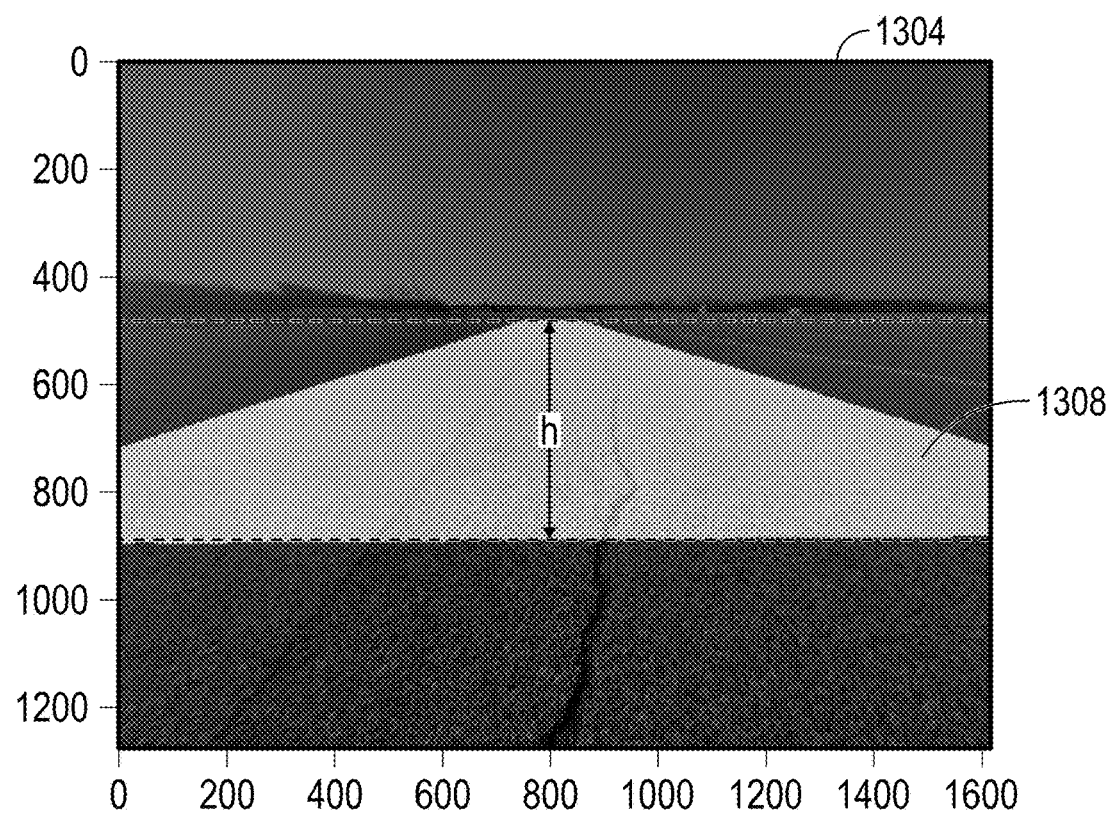

FIG. 13 shows two images 1300 demonstrating the scalability of the road mask based on image field of view. A standard-sized image 1302 and a zoom image 1304 are shown. The standard-sized image 1302 has a standard road mask 1306 superimposed on it. The standard road mask 1306 is defined by the various parameters, such as the coordinates $(c_x, c_y)$ of a center of the standard-sized image 1302 and the vertical boundaries $\{y_{min}, y_{max}\}$ of the standard road mask 1306. When the camera shifts from showing the standard-sized image 1302 to showing the zoom image 1304, the standard road mask 1306 can be rescaled to a zoom road mask 1308 using the method discussed herein with respect to FIG. 14.

Figure 14:
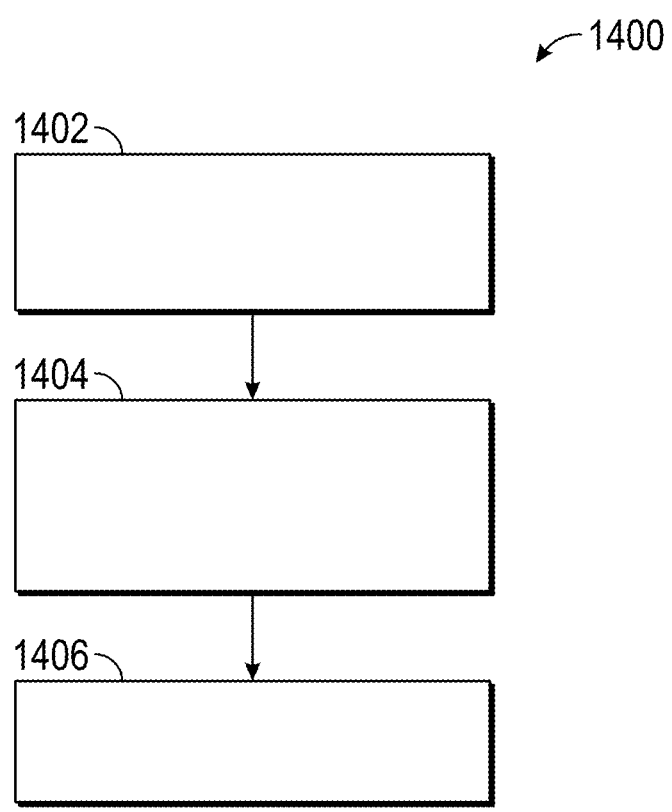
FIG. 14 shows a flowchart of a scaling procedure suitable for scaling a road mask based on image field of view.

FIG. 14 shows a flowchart 1400 of a scaling procedure suitable for scaling a road mask based on image field of view. In box 1402, the vertical boundaries $\{y_{min}, y_{max}\}$ of the standard road mask 1306 are determined. In box 1404, a scaling factor s for the field of view transformation is calculated based on the coordinates $(c_x, c_y)$ of the image center, the vertical boundaries, and the expected height h of the transformed road mask. In various embodiments, the scaling factor s is determined using Eq. (4):

$$s = \min\left\{\frac{h/2}{c_y - y_{min}}, \frac{h/2}{y_{max} - c_y}\right\} \quad \text{Eq. (4)}$$

In box 1406, the scaling factor s is applied to the intrinsic transformation matrix $K_{int}$ to obtain a scaled transformation matrix $K_{scaled}$, as shown in Eq. (5):

$$K_{scaled} = K_{int} \begin{bmatrix} s & 0 & 0 \\ 0 & s & 0 \\ 0 & 0 & 1 \end{bmatrix} \quad \text{Eq. (5)}$$

Figure 15:
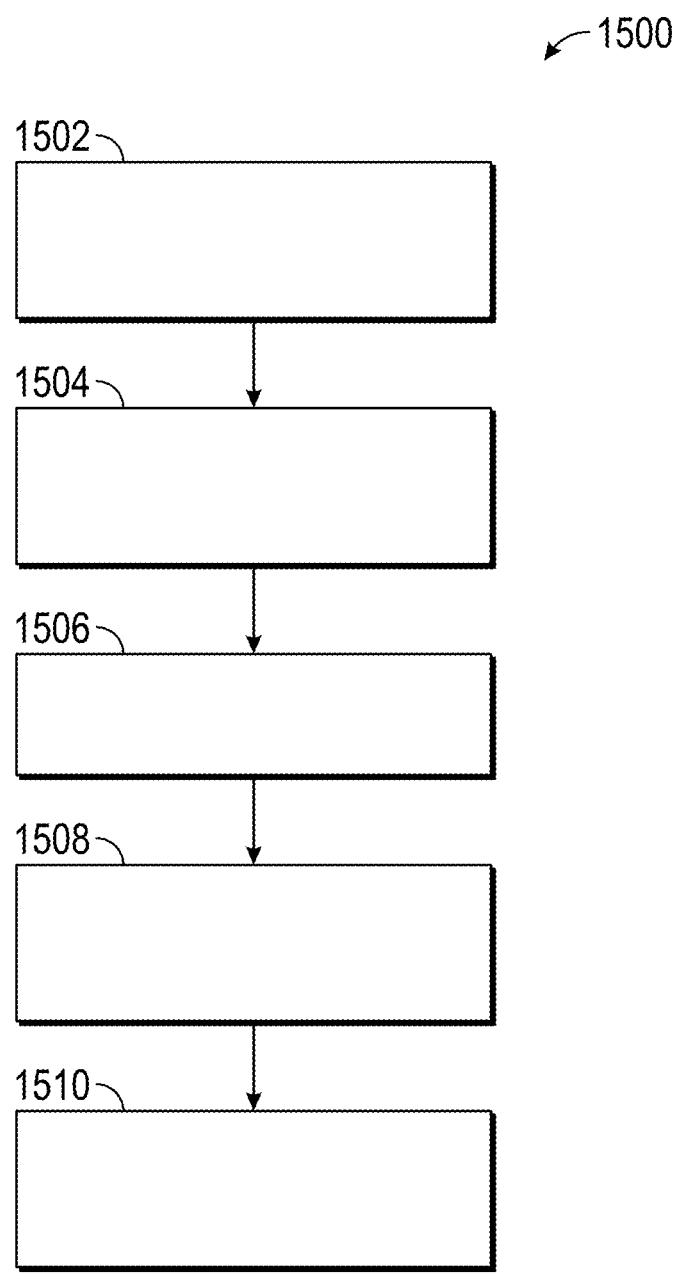
FIG. 15 shows a flowchart for determining a confidence level for an alignment, as performed by the confidence generation module of FIG. 3.

FIG. 15 shows a flowchart 1500 for determining a confidence level for an alignment, as performed by the confidence generation module of 318 of FIG. 3. In box 1502, a plurality of alignment values (e.g., 100 alignment values) are obtained between adjacent frames. In box 1504, a moving average of the alignment values is determined for the alignment values. For example, the moving average can include ten of the 100 alignment values. In box 1506, for each moving average, a confidence level is determined. The confidence level for a moving average can be based on various conditions during the moving average, such as distance traveled, change in vehicle speed, etc. In box 1508, moving averages having confidence level that is less than a selected threshold are removed. In box 1510, the remaining moving averages are combined to form a weighted average value of the alignment. This alignment can be used to update the camera-vehicle alignment value, as necessary.

In various embodiments, the vehicle is maneuvered through its environment based on data obtained from the cameras and therefore the accuracy of such data is dependent on the alignment of the camera. By accurate alignment the camera to the ground coordinate system, the location of objects within the environment is known to a greater accuracy, thereby improving the ability of the vehicle to be maneuvered with respect to the objects.

The alignment method disclosed herein can be performed in situ while the vehicle is in motion on a roadway using objects found in its environment, which allows for instant alignment at any given moment of the driving experience. This is an improvement over alignment performed only in a laboratory or service department setting, since this alignment can be performed at any time. In addition, the method disclosed herein for reducing the original image data file to obtain a reduced image data file frees computational time for other processes of the vehicle. Therefore, the claimed embodiments effectuate an improvement in the technical field of camera alignment in vehicles.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of navigating a vehicle, comprising:
obtaining an original image data file of an environment at a camera conveyed by the vehicle;
reducing the original image data file to obtain a reduced image data file;
determining an alignment between a camera-centered coordinate system and a ground coordinate system using the reduced image data file; and
determining a weighted average value of the alignment using a confidence level of a moving average of the alignment for a plurality of frames of the reduced image data file.

2. The method of claim 1, wherein the original image data file includes a plurality or temporally spaced frames.

3. The method of claim 2, wherein obtaining the reduced image data file further comprises at least one of: (i) selecting a first frame and a second frame from a plurality of temporally spaced frames of the original image data file, wherein a temporal spacing between the first frame and the second frame is based on a velocity of the vehicle; (ii) removing a pixel from a frame of the original image data file using on a reduction algorithm; and (iii) cropping the frame to remove a section of the frame.

4. The method of claim 3, further comprising forming a feature pair between a first feature of the first frame and a second feature of the second frame and removing the feature pair when a metric of the first feature and the second feature is less than a criterion.

5. The method of claim 4, further comprising assigning a quality score to the feature pair and removing the feature pair when the quality score is less than a quality threshold.

6. The method of claim 1, further comprising generating a road mask in an image plane of the camera from the alignment.

7. The method of claim 1, further comprising controlling the vehicle to navigate the vehicle with respect to an object in a road using an image obtained from the camera after alignment.

8. A system for navigating a vehicle, comprising:
a camera conveyed by the vehicle, the camera configured to obtain an original image data file of an environment; and
a processor configured to:
reduce the original image data file to obtain a reduced image data file;
determine an alignment between a camera-centered coordinate system and a ground coordinate system using the reduced image data file; and
determine a weighted average value of the alignment using a confidence level of a moving average of the alignment for a plurality of frames of the reduced image data file.

9. The system of claim 8, wherein the original image data file includes a plurality or temporally spaced frames.

10. The system of claim 9, wherein the processor is further configured to obtain the reduced image data file by performing at least one of: (i) selecting a first frame and a second frame from a plurality of temporally spaced frames of the original image data file, wherein a temporal spacing between the first frame and the second frame is based on a velocity of the vehicle; (ii) removing a pixel from a frame of the original image data file using on a reduction algorithm; and (iii) cropping the frame to remove a section of the frame.

11. The system of claim 10, wherein the processor is further configured to form a feature pair between a first feature of the first frame and a second feature of the second frame and remove the feature pair when a metric of the first feature and the second feature is less than a criterion.

12. The system of claim 11, wherein the processor is further configured to assign a quality score to the feature pair and remove the feature pair when the quality score is less than a quality threshold.

13. The system of claim 8, wherein the processor is further configured to generate a road mask in an image plane of the camera from the alignment.

14. The system of claim 8, wherein the processor is further configured to control the vehicle to navigate the vehicle with respect to an object in a road using an image obtained from the camera after alignment.

15. A vehicle, comprising:
   a camera configured to obtain an original image data file of an environment; and
   a processor configured to:
      reduce the original image data file to obtain a reduced image data file;
      determine an alignment between a camera-centered coordinate system and a ground coordinate system using the reduced image data file; and
      determine a weighted average value of the alignment using a confidence level of a moving average of the alignment for a plurality of frames of the reduced image data file.

16. The vehicle of claim 15, wherein the original image data file includes a plurality or temporally spaced frames.

17. The vehicle of claim 16, wherein the processor is configured to obtain the reduced image data file by performing at least one of: (i) selecting a first frame and a second frame from a plurality of temporally spaced frames of the original image data file, wherein a temporal spacing between the first frame and the second frame is based on a velocity of the vehicle; (ii) removing a pixel from a frame of the original image data file using on a reduction algorithm; and (iii) cropping the frame to remove a section of the frame.

18. The vehicle of claim 17, wherein the processor is further configured to form a feature pair between a first feature of the first frame and a second feature of the second frame and remove the feature pair when a metric of the first feature and the second feature is less than a criterion.

19. The vehicle of claim 18, wherein the processor is further configured to assign a quality score to the feature pair and remove the feature pair when the quality score is less than a quality threshold.

20. The vehicle of claim 15, wherein the processor is further configured to generate a road mask in an image plane of the camera from the alignment.

* * * * *